Figure 12:
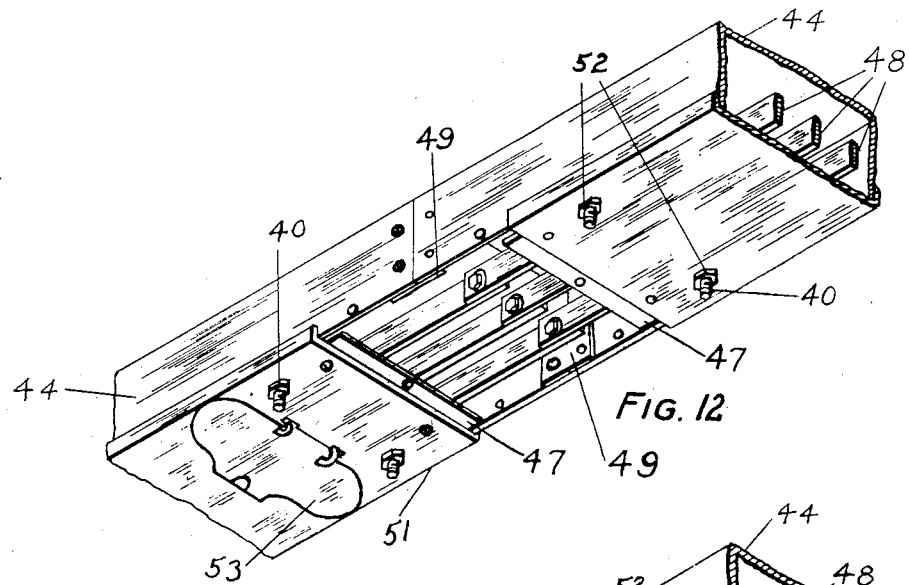

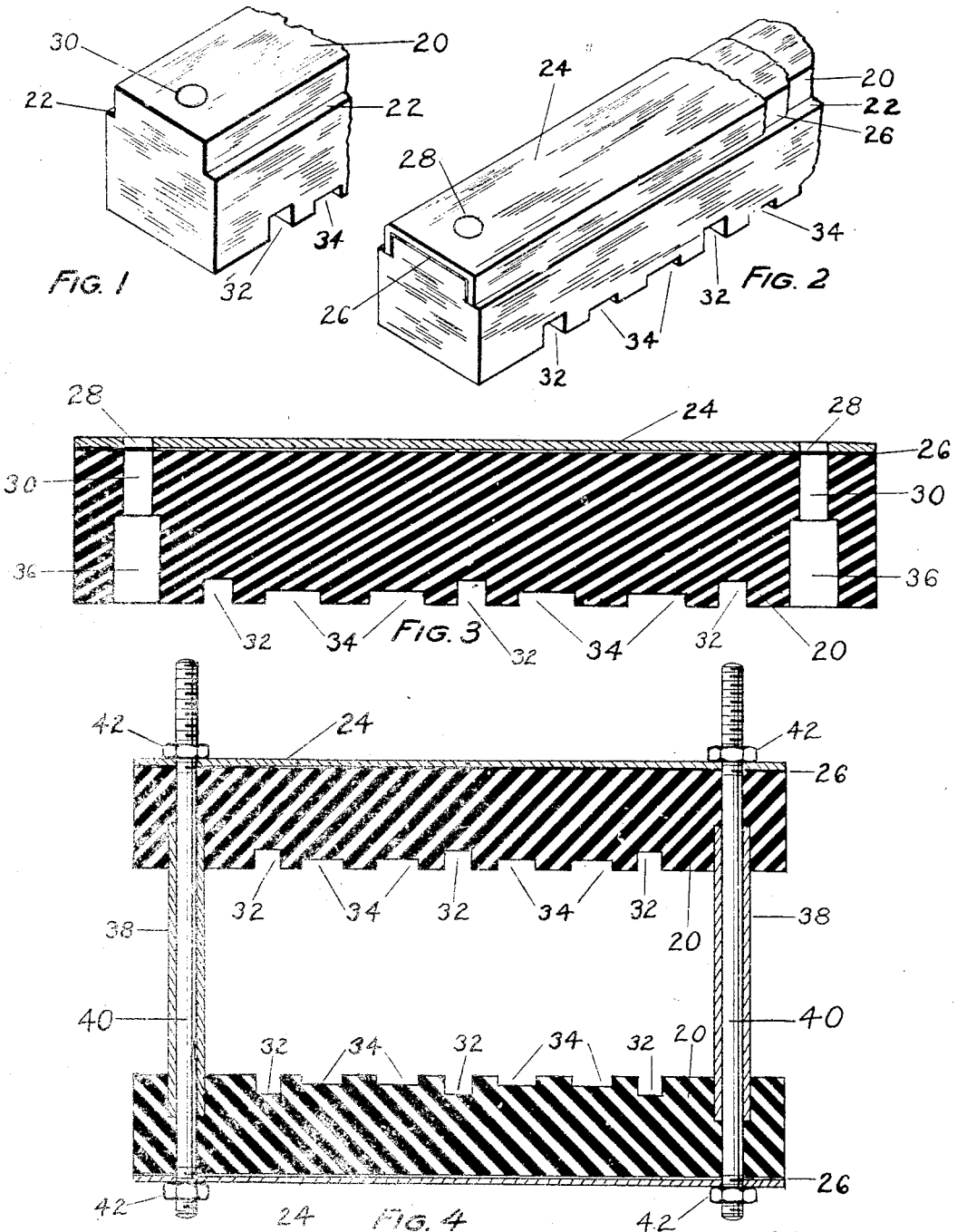

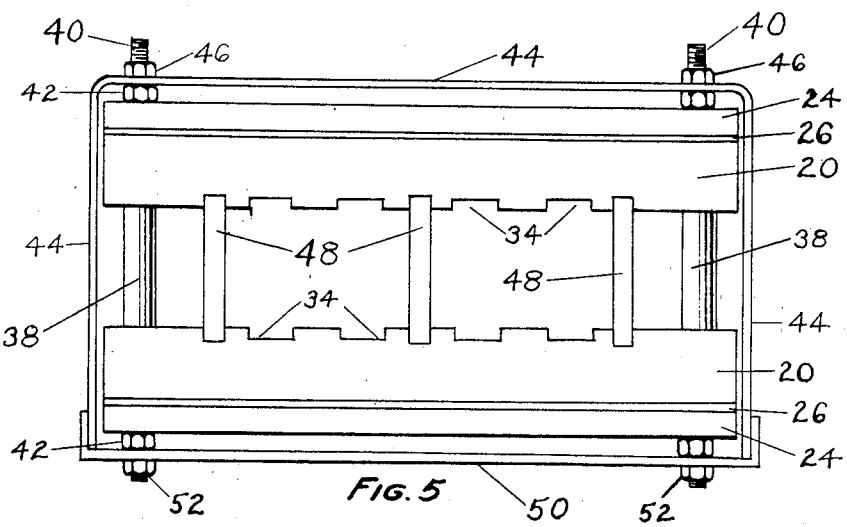
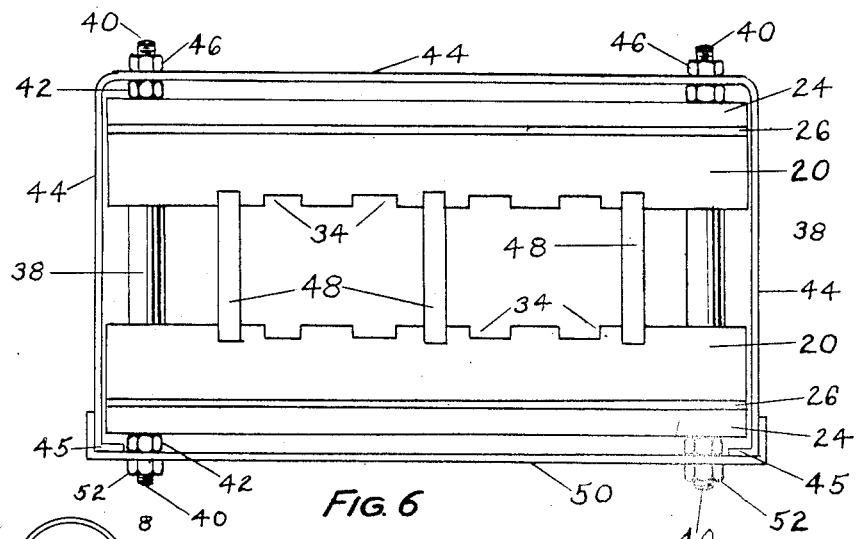
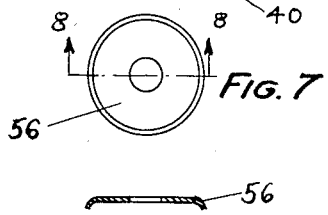
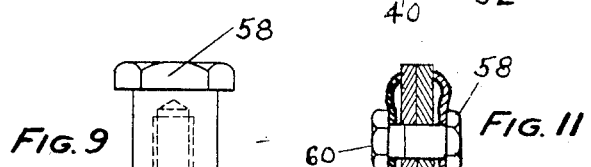
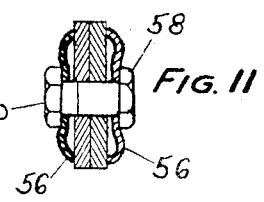
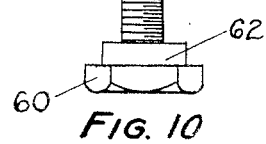

Feb. 16, 1943. F. B. ADAM 2,310,919
BUS DUCT
Filed June 20, 1941 4 Sheets-Sheet 3

INVENTOR
Frederick B. Adam
BY
Roy M. Eilers
ATTORNEY

Feb. 16, 1943.  F. B. ADAM  2,310,919
BUS DUCT
Filed June 20, 1941  4 Sheets-Sheet 4
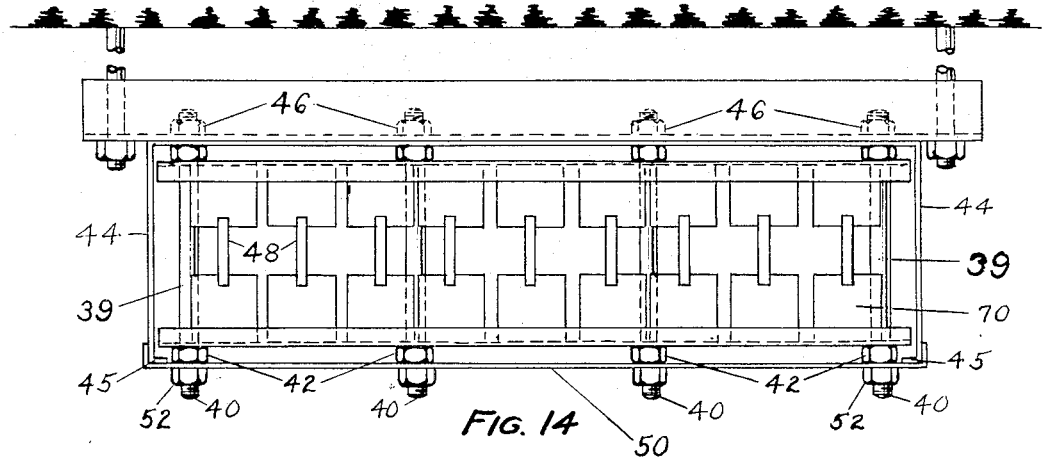
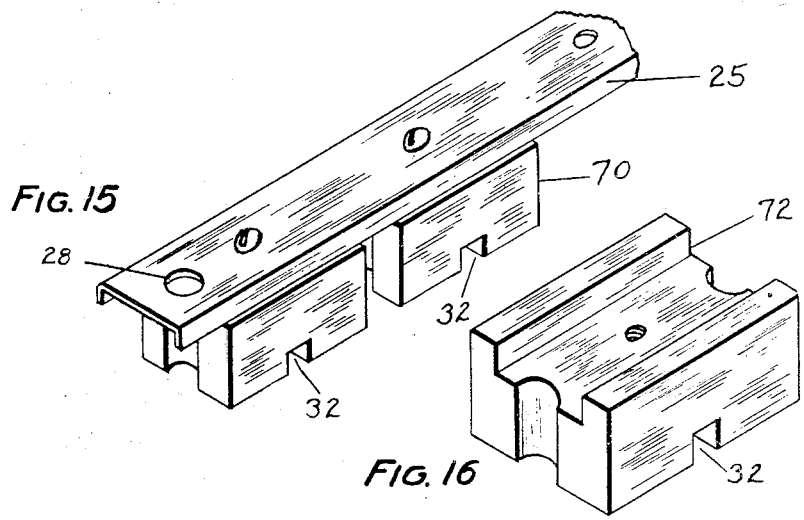
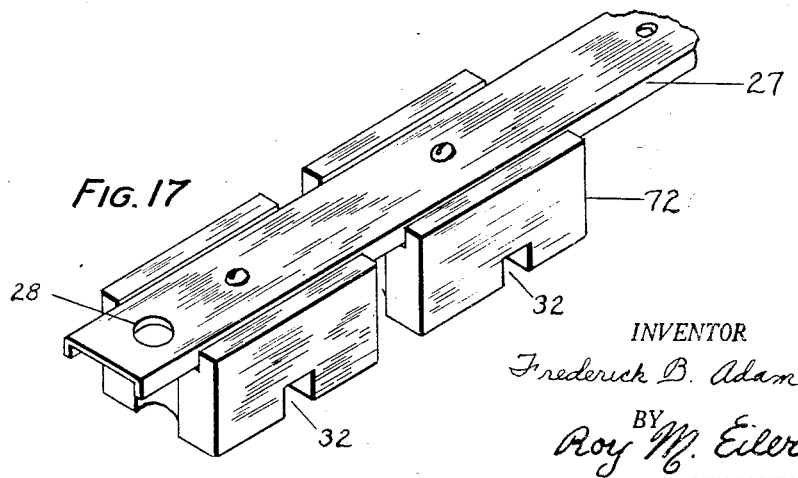
INVENTOR
Frederick B. Adam
BY Roy M. Eilers
ATTORNEY

UNITED STATES PATENT OFFICE

2,310,919

BUS DUCT

Frederick B. Adam, St. Louis County, Mo., assignor to Frank Adam Electric Company, St. Louis, Mo., a corporation of Missouri Application June 20, 1941, Serial No. 398,870

2 Claims. (Cl. 174—99)

This invention relates to improvements in bus ducts. More particularly, the invention relates to improvements in bus ducts that enclose and are rigidly secured to bus bars.

It is an object of the present invention to provide an improved bus duct.

This invention consists of improvements on the bus duct disclosed in my Patent No. 2,216,870. That patent disclosed a bus duct of novel structure. This structure has subsequently been improved, and the bus duct containing this improved structure has been made a better and less expensive article of manufacture. This improved structure constitutes my new invention.

The present trend today is to make the sheet metal duct enclosures for bus runs of heavier and heavier metal. Testing laboratories demand heavier enclosures for the bus bars on the ground that the enclosures might receive heavy blows. In such a case, the laboratories state, a light weight sheet metal enclosure would be bent until it either touched the bus bars or dislodged the bus bars. In either case, serious damage might occur. As a result, the manufacturers of bus ducts are being required to enclose the bus bars in a metal enclosure that is strong enough to resist heavy blows. The necessity of using heavy metal for the enclosure, not only increases the cost of manufacture of the bus duct, but it adds materially to the weight of the duct. This is quite objectionable. The invention obviates this objection by providing an improved method of securing an enclosure to a bus run that permits the use of lighter metal without lessening the strength of the duct enclosure. This is done by securing the enclosure directly to the bus bar supports in such a way that a box-like truss is formed. It is, therefore, an object of the invention to provide an improved method of securing an enclosure to a bus run to form a box-like truss.

Bus ducts of different sizes and designs are being made today. Where the ducts are relatively small, the manufacturers make them in short assembled lengths that can be shipped and installed quite easily. Where the ducts are large, however, the combined weight of the duct and the bus bars is so great, that it is exceedingly difficult to install the assembled length of the ducts. Because of this, it has heretofore been necessary to take the assembled lengths of the ducts apart, and install them piece by piece. This is disadvantageous because it increases the time and money that must be expended in installing the duct. The present invention avoids this costly practice by providing a duct that may be installed quite readily regardless of size or weight. This is the result of the novel design of the duct that permits the installer to remove the bus bars, install the duct, and then reinsert the bus bars. By reason of this novel structure, the installer saves considerable time and effort in installing the duct.

When the bus bars carry a sizable current, they tend to become warm and expand. Provision must be made for this type of expansion or else the bars will bend and thereby vary the distance between themselves. Many of the bus ducts now in use have an expansion joint that enables bars to expand and contract without interrupting the flow of current through the bars. These expansion joints are well known in the art and are universally used, but they are expensive. Their use is not, therefore, particularly desirable. Not only must a duct make provision for the expansion and contraction of the bus bars, it must make some provision for the maintenance of adequate contact pressure between the ends of the bus bars. This is necessary to maintain high electrical conductivity for the bus duct. The ducts in use today employ ordinary steel bolts and nuts to secure adequate contact pressure between the ends of the bus bars. It can be seen from the above that ordinary bus ducts must use nuts and bolts to secure the bus bars together, and must use an expansion joint to allow free expansion and contraction of the bus bar. This requires the use of two separate groups of elements in the duct. The present invention provides a new combination that takes the place of the two separate groups of elements formerly used in bus ducts. This combination not only compensates for the expansion and contraction of the bus bars, but it also maintains adequate contact pressure between the bars. This novel combination consists of a jam bolt and a pair of resilient washers that cooperate to permit movement of the bus bars relative to each other while they maintain adequate contact pressure between the bus bars. It is, therefore, an object of the present invention to provide a novel jam bolt and resilient washer combination that may be used to secure the ends of the bus bars together.

Many manufacturers of bus ducts today use different designs for the different size bus ducts. In many cases a bus duct having one capacity will be quite different from another bus duct having a different capacity. This is especially true where one of the ducts has provision for plug-in connections. In some cases, the manufacturer will have a feeder bus duct and a plug-in bus duct, for the same capacity, that are quite different in structure and design. This means not only that the two ducts cannot be used interchangeably, but that the manufacturer must have two sets of different tools for each capacity bus duct. This increases the cost of manufacturing the bus duct. The invention provides a cheaper and simpler bus duct having a principal design that can be used with minor alterations as a feeder duct or as a plug-in duct and can be made for any capacity, large or small. It is, therefore, an object of the present invention to provide a bus duct that can be used with minor alterations as a feeder duct or a plug-in duct that can be made for any capacity, large or small.

Other objects and advantages of the invention will appear from the drawings and accompanying description.

In the drawings and accompanying description, several preferred embodiments of the invention are shown and described, but it is to be understood that the drawings and accompanying description do not limit the invention and the invention will be defined by the appended claims.

Figure 13:
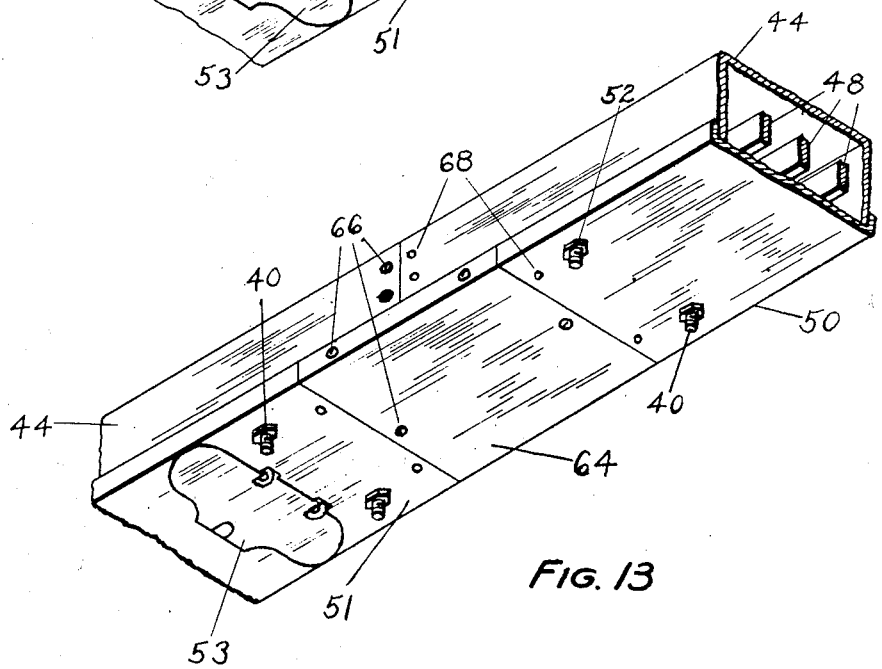

In the drawings, Fig. 1 is a perspective view of a portion of a preformed insulator used in the bus duct, Fig. 2 is a perspective view of the preformed insulator in Fig. 1 as it appears when it is assembled with a U-shaped channel, Fig. 3 is a cross-sectional view of the preformed insulator and channel shown in Fig. 2, Fig. 4 is a cross-sectional view of an "insulator unit" provided by the invention, Fig. 5 is an end view of an assembled length of the principal design of the bus duct, Fig. 6 is an end view of an assembled length of a modified design of the bus duct, Fig. 7 is a side elevational view of a resilient washer used in the invention, Fig. 8 is a cross sectional view of the resilient washer shown in Fig. 7 and is taken along the plane 8—8, Fig. 9 is a side elevational view of the female member of a jam bolt assembly used in the invention, Fig. 10 is a side elevational view of the male member of the jam bolt assembly, Fig. 11 is a cross-sectional view of the junction between two bus bars and the jam bolt and resilient washer combination that holds them in assembled rotation, Fig. 12 is a perspective view of the joint between an assembled length of feeder bus duct and an assembled length of plug-in bus duct, Fig. 13 shows a perspective view of the joint in Fig. 12 after the cover plate has been attached to the duct.

Fig. 14 is an end view of a multi-bar bus duct installation that is secured to a building, Fig. 15 is a perspective view of an optional form of preformed insulator and support therefor that is useful for multi-bar ducts, Fig. 16 is a perspective view of another optional form of preformed insulator that has been used in multi-bar bus ducts, and Fig. 17 is a perspective view of a number of insulators of the type shown in Fig. 16 that are attached to a support.

Referring to the drawings in detail, a preformed insulator is denoted by the numeral 20. This insulator has a pair of shoulders 22 near its upper edge. These shoulders receive the flanged edges of a U-shaped channel 24. The shoulders 22 of the insulator 20 are preferably made wider than the flanged edges of the channel 24. Since the shoulders 22 are wider than the edges of the channel 24, the edges of the shoulders necessarily must extend beyond the edges of channel 24 and serve to prevent the formation of electrical arcs between the bus bars 48 and the channel 24. This arrangement makes it possible to use a compact insulator without increasing the likelihood of having an electrical arc form between the bus bars 48 and the channel 24. The channel 24 encloses the top of the insulator 20 and serves to make it more resistant to breakage. In the preferred embodiment of the invention, the insulator 20 is separated from the channel 24 by a sheet 26 of relatively soft and yielding material. This sheet 26 may be made of any suitable material, and the cheapest and easiest to use is blotting paper. This sheet cushions the insulator from shocks transmitted by the channel 24. This reduces the likelihood of breakage of the insulator. The U-shaped channel 24, the yielding sheet 26, and the insulator 20 are secured together by a supporting bolt 40 that extends through hole 28 in the channel 24, a hole in the sheet 26, and hole 30 in the insulator 20. The bottom surface of insulator 20 is provided with a number of slots 32 that receive the edges of bus bars 48. The slots 32 in insulator 20 maintain the bus bars 48 in spaced relation and prevent lateral movement of the bars. These slots 32 are spaced from each other to provide a large enough air gap between the bars 48 to prevent the formation of electrical arcs between the bars. The bottom surface of the insulator is also provided with other slots 34. These slots 34 can be made much shallower than the bus bar receiving slots 32. These slots 34 are used to increase the lineal distance along the bottom face of the insulator 20 between the bus bars 48. The ends of the preformed insulator 20 are each provided with a hole 30 to receive bolt 40. Each of the holes 30 has an enlarged portion or recess 36 that receives a tubular spacer 38. The tubular spacers 38 extend into the recesses 36 of a pair of insulators 20 and maintain the insulators 20 in spaced relation. These spacers may be of any suitable material, but where they are made of insulating material, the gap between the spacers and the bus bars can be made smaller, and the bus duct can thereby be made more compact. A supporting bolt 40 extends through hole 28 in channel 24, the hole in the sheet 26, the hole 30 in the insulator 20, the tubular spacers 38, the hole 30 of the second insulator 20, the hole in the second sheet 26, and the hole 28 in the second channel 24. Nuts 42 are threaded onto the ends of supporting bolts 40 and hold all the various parts together. When assembled in this manner, the various elements form an "insulator unit."

Many of the bus duct installations call for two or three bus bars and it has been found to be economical to cast insulators that can accommodate two or three bus bars. Where the duct encloses more than three bus bars, it is not economical to cast insulators for each duct since the number of bars varies considerably. In these installations a number of individual insulators that each accommodates one bus are used. These insulators are secured to a suitable support and are integrated into "insulator units."

The bus duct consists of a number of "insulator units," a U-shaped enclosure, a closure section, and bus bars. The U-shaped enclosure consists of a series of U-shaped lengths. These lengths are preferable made from flat sheets of metal that have a number of holes punched out of them. These holes are preferably grouped in pairs. These flat sheets are subsequently folded into a U-shape. Each of them serves to enclose three sides of the "insulator units." Where desired, the enclosure 44 may be made of non-magnetic material. This can be done because the enclosure does not support the bus bars, and is actually supported by the "insulator units." Because of this construction, the enclosure does not have to carry more than its own weight and does not have to be very strong. The enclosure can be made out of light metal such as copper, of aluminum, or can be made of non-metallic materials such as transite board or ebony asbestos. The enclosure section and the closure section can be made of any material that possesses a fair amount of structural strength. The use of non-magnetic material is advantageous since it does not cause an inductive effect that would reduce the conductivity of the bus bars. The holes in the U-shaped enclosure 44 receive the ends of the supporting bolts 40 of the "insulator units." When the "insulator units" have been inserted in the holes in the U-shaped enclosure 44 so that the bolts 40 extend through the holes, nuts 46 are threaded onto the ends of supporting bolts 40. These nuts 46 secure the "insulator units" to the enclosure 44. Bus bars 48 are then inserted into slots 32 and pushed along between the insulators. This can be done quite readily since the tubular spacers maintain the insulators in spaced relation and permit the ready insertion of the bus bars 48. Ordinarily, the U-shaped enclosure 44 is made in the manner shown in Fig. 5. Where, however, the bus bars 48 are unusually wide or the sheet metal of the enclosure 44 is unusually light, the open ends of the enclosure 44 may be folded as shown in Fig. 6 and Fig. 14. The folding of the ends of the arms of the U-shaped enclosure 44 to form an angle 45 greatly stiffens the sides of the enclosure 44. This angle not only stiffens the sides of the enclosure, it makes the entire duct much stronger. Where the ends of the arms of the enclosure have been folded, the ends of the arms can be spread apart to permit insertion of the "insulator units." After the bus bars have been inserted, a closure section 50 that has a number of pairs of holes therein, is slipped over the ends of the supporting bolts 40 of the "insulator units." Nuts 52 are threaded onto the lower ends of supporting bolts 40 to secure the closure section 50 to the rest of the duct. The bus duct shown in Fig. 5 is a typical length of bus duct. A study of this figure indicates that the backbone of the duct is the "insulator unit," since every part of the duct is supported by the supporting bolts 40 of the "insulator unit."

In the field the duct is secured to a building or other structure in any desirable manner. The contractor usually secures the duct to hangers or other devices that are directly supported by the building. The nuts 46 are removed from the ends of supporting bolts 40, the supporting bolts 40 are inserted into holes in the hangers, and the nuts 46 again threaded onto supporting bolts 40. Such an arrangement secures the "insulator units" directly to the building or structure and makes a solid installation feasible. The bus duct provided by the invention can be secured to a building in a number of ways. Because the bolts 40 extend from the top and bottom of the duct, there are four points where the duct can be attached to a hanger or directly to the building. The duct may be supported by the two top nuts 46, by the bottom nuts 52, or by any combination of top nuts 46 and bottom nuts 52. This permits a great deal of latitude in installing the duct.

To join the ends of adjacent bus bars together, the invention utilizes at least one securing combination. Where large bars are used, more than one securing combination is needed. Each securing combination consists of a pair of resilient washers and a jam bolt. The resilient washers are preferably made in the form of a cup and are preferably made of phosphor bronze. This material is quite sturdy and is non-magnetic. The jam bolt members 58 and 60 are also made of non-magnetic material. The use of a non-magnetic material in the resilient washers 56 as well as the bolt members 58 and 60, avoids an inductive effect that reduces the conductivity of the bus bars. The male member 60 has a shoulder 62 thereon that engages a shoulder on the female member 58. The member 60 also has a threaded end that is screwed into member 58. The shoulder 62 and the threaded end of the male member are dimensioned to positively limit the distance between the heads, or bearing surfaces, of the members. This distance is calculated to cause a slight compression of the washers and thereby exert a predetermined pressure on the bus bars. This pressure is large enough to maintain adequate contact pressure between the bus bars as shown in Fig. 11, but is small enough to permit movement of the bars relative to each other due to expansion and contraction. The use of this single combination obviates the use of two separate groups of elements formerly used. This makes the bus duct a simpler and less expensive article of manufacture.

The closure sections 50 of the duct are made shorter than the U-shaped lengths that constitute the enclosure. When the U-shaped lengths of the enclosure have been attached to the building and the closure sections secured to the "insulator units," the ends of adjacent closure sections will form apertures. These apertures permit the workmen to reach into the duct and connect the ends of the bus bars with the jam bolt and resilient member combination. These apertures are closable by cover plates 64 that are secured to the U-shaped length of enclosure 44 and to rabbets 47 on the closures 50 by screws 66. These screws are seated in the edges of the U-shaped enclosure 44 and in the edges of the rabbets 47 which are riveted to the closures 50. The rabbets 47 and the U-shaped coupling 49 on the U-shaped enclosure 44, underlie the adjoining edges of the sections of duct and prevent a straight line path from the exterior of the duct to the interior of the duct. This is an additional advantage for the duct since it keeps the bus bars free of dust and dirt. The coupling 49 is secured to one U-shaped length by rivets 68 and to the other U-shaped length by screws 66.

The bus duct of the invention is designed so a feeder duct can be changed into a plug-in duct by removing closure section 50 and substituting closure section 51. This section has a number of holes therein that are closed by plug-in covers 53. By reason of this design, one form of duct can be made which may be converted into a feeder or plug-in duct as desired. Because of the manner in which the bus duct is constructed, plug-in outlets may be located in the enclosure 44 or in the closure sections 50 or in both. This makes the invention very versatile and therefore quite desirable.

Fig. 14 is an end view of a multi-bar bus duct installation. The salient features of this installation are identical with those of the three bar installations. The insulators differ in one respect. Instead of being made as a unit that can accommodate a standard number of bus bars, it consists of a number of preformed individual insulators that are attached to an insulator support. By altering the length of the insulator support, the manufacturer can determine how many bus bars the duct can accommodate. The insulators are secured to the insulator supports and the insulator supports are then assembled to form an "insulator unit" similar to that shown in Fig. 4. The insulator supports are spaced apart by tubular spacers 39 and are secured together by supporting bolts 40.

The individual preformed insulator may be of any suitable shape and two such shapes are shown in the drawings. The shape 70 shown in Fig. 15 is similar to that of the insulator in Fig. 1. It has the same shoulder and same bus bar receiving slot. In other respects it is different since it must be screwed or bolted to the insulator support and it accommodates only one bus bar. The opposite ends of the insulators have an arcuate recess that cooperates with the recess in an abutting insulator to receive a tubular spacer 39 of insulating material. This spacer 39 is similar to spacer 38 but is longer since it extends from one support 25 to the other support 25 instead of from one insulator 20 to the other insulator 20. The recess in the insulators makes it possible to place tubular spacers 39 of insulating material and supporting bolts 40 at frequent intervals to reinforce the duct, without additionally enlarging the duct.

Another form of insulator 72 that has been used is shown in Figs. 16 and 17. This insulator has a recess in the top thereof that receives an insulator support 27. This form of insulator is not as desirable as that shown in Fig. 15 since the support 27 is not as strong. This form is not as desirable for another reason; if the flanged edges of the insulator support 27 are not the same length, the insulator will be askew. So many different types of insulators are known and used today that the selection of the particular one is a matter of engineering design.

In assembling a multi-bar bus duct, the "insulator units," are first integrated. In integrating the "insulator unit," an insulator support of the proper size is selected, and the appropriate insulators are attached to it. By changing the length of the insulator support, it is possible to change the number of bus bars accommodated by the duct. The insulators are preferably formed with concave arcuate recesses in their opposite ends. These recesses receive tubular spacers 38 that space the supports apart, and permit the placing of these tubular spacers at frequent intervals without enlarging the duct. When the insulators have been secured to the insulator supports, the tubular spacers 39 are inserted between the supports and the supporting bolts 40 are extended through the holes in the support, the tubular spacers, and out of the hole in the other insulator support. The nuts 42 are then threaded onto the supporting bolts 40. This maintains the "insulator unit" as an integrated unit. The "insulator units" are then set in the U-shaped enclosure 44 so the supporting bolts 40 extend through holes in the enclosure. Nuts 46 are threaded onto the ends of the supporting bolts that extend through the enclosure and serve to secure the units to the enclosure. Bus bars are then pushed between the insulators. This is done quite easily since the tubular spacers 39 maintain the insulators at the proper distance from each other. The closure section is then slipped over the ends of supporting bolts 40 and nuts 52 are threaded onto the ends of the supporting bolts. The bolting of the U-shaped enclosure and the closure section directly to the "insulator units" forms a box-like truss that is quite strong. The "insulator units" form a rectangle that is quite stiff. The bolts 40 are supported by the insulators 20 and prevent a skewing of the parts of the insulator unit. The bolts 40 extend through holes in the enclosure 44 and the closure section 50 and keep it from skewing. If the enclosure 44 receives a heavy blow, the blow will not only be resisted by the enclosure 44 but will be resisted by the "insulator unit." This makes a very strong duct assembly. When the sides of the enclosure 44 are long or when the metal is light, the edges of the enclosure 44 are bent to form flanged edges 45. These edges materially strengthen the duct. With this construction a very strong duct enclosure can be made of relatively light metal, since each part of the duct is supported by every other part of the duct and every part of the duct is secured to the building. In addition, the supporting of the closure section by the supporting bolts 40 eliminates the old practice of using a great number of small screws along the edge of the duct. The use of the screws is objectionable since it increases the cost of manufacture and materially increases the time required to install the duct in the field.

When the closure section 50 has been secured to the "insulator units," the duct can be shipped. In installing the duct, it is necessary only to remove the nuts 46 from the ends of the supporting bolts 40, insert the ends of the supporting bolts 40 through suitable openings in the structure or building or in hangers attached to the building, and thread the nuts 46 onto the supporting bolts. In some multi-bar bus ducts, the combined weight of the duct and the bus bars is so great, that the assembled lengths of duct cannot be installed. In such cases, the installers freely draw the bus bars from the duct, secure the duct to the building, and reinsert the bus bars. This can be done because the tubular spacers 39 always maintain the insulators at the proper distance from each other.

Although preferred embodiments of the invention have been shown and described in the drawings and accompanying description, it is obvious to those skilled in the art that various changes may be made in the forms of the invention without changing the scope of the invention.

What I claim is:

1. In a bus duct structure a pair of oppositely disposed insulators, said insulators being provided with complementary slots opening to an edge thereof to accommodate a bus bar therein, means for spacing said insulators at a predetermined distance apart, each of said insulators being provided with a reduced portion opposite the slotted edge, a metallic channel member fitted over said reduced portion, said reduced portion forming a shoulder which sets the channel member back from the sides of the insulator to provide a tortuous path between the bus bars and the channel member and thus prevent arcing therebetween, supporting members extending through the insulator members and supporting them in proper position and an enclosure enclosing the insulators and bus bars held therebetween and supported by said supporting members.

2. A bust duct structure compriisng a pair of oppositely disposed complementary insulator plates provided with slots opening on the edges which face each other, means to maintain said insulator plates at a predetermined distance apart, bus bar conductors positioned in the complementary slots of the insulator plates, each of said insulator plates being provided with a reduced portion on the side thereof opposite the slots, a channel member clamped around the reduced portion of each of said insulator plates, resilient material between the insulator plates and the clamping member, supporting means extending through the pair of insulator plates and serving to support the insulator plates and bus bars and a duct enclosure enclosing the insulator plates and the bus bars supported therebetween, said bus enclosure comprising an inverted trough shaped section and a cover section therefor, said supporting means extending through the cover section to provide a support therefor.

FREDERICK B. ADAM.

CERTIFICATE OF CORRECTION.

Patent No. 2,310,919.  February 16, 1943.

FREDERICK B. ADAM.

It is hereby certified that error appears in the printed specification of the above numbered patent requiring correction as follows: Page 4, second column, line 57, for "freely" read --merely--; page 5, first column, line 13, for "compriisng" read --comprising--; and that the said Letters' Patent should be read with this correction therein that the same may conform to the record of the case in the Patent Office.

Signed and sealed this 4th day of May, A. D. 1943.

(Seal)

Henry Van Arsdale,
Acting Commissioner of Patents.